US008666873B2

(12) United States Patent
Dale et al.

(10) Patent No.: US 8,666,873 B2
(45) Date of Patent: Mar. 4, 2014

(54) SYSTEMS AND METHODS FOR OPEN EXECUTION AUCTION TRADING OF FINANCIAL INSTRUMENTS

(75) Inventors: William JP Dale, New York, NY (US); Dmitry A. Raykhman, Brooklyn, NY (US)

(73) Assignee: Curex Innovations LLC, New York, NY (US)

( * ) Notice: Subject to any disclaimer, the term of this patent is extended or adjusted under 35 U.S.C. 154(b) by 0 days.

(21) Appl. No.: 13/538,257

(22) Filed: Jun. 29, 2012

(65) Prior Publication Data

US 2013/0006828 A1    Jan. 3, 2013

Related U.S. Application Data

(60) Provisional application No. 61/503,833, filed on Jul. 1, 2011.

(51) Int. Cl.
    *G06Q 40/00* (2012.01)
(52) U.S. Cl.
    USPC .......................................................... 705/37
(58) Field of Classification Search
    USPC .......................................................... 705/37
    See application file for complete search history.

(56) References Cited

U.S. PATENT DOCUMENTS

| | | | |
|---|---|---|---|
| 7,020,626 B1 | 3/2006 | Eng et al. | |
| 7,167,837 B1 | 1/2007 | Ciampi et al. | |
| 7,171,386 B1 | 1/2007 | Raykhman | |
| 7,363,269 B2 | 4/2008 | Horsfall et al. | |
| 7,366,690 B1 | 4/2008 | Howorka et al. | |
| 7,433,837 B2 | 10/2008 | Dawson | |
| 7,574,394 B2 | 8/2009 | Chorna et al. | |
| 7,636,682 B1 | 12/2009 | MacPherson | |
| 7,680,722 B2 | 3/2010 | Bok et al. | |
| 7,711,632 B2 | 5/2010 | Chorna et al. | |
| 7,840,483 B2 | 11/2010 | Youngren et al. | |
| 7,856,392 B1 * | 12/2010 | Fishbain et al. | 705/36 R |
| 7,937,316 B2 | 5/2011 | Friedman et al. | |
| 2002/0052821 A1 * | 5/2002 | Waelbroeck et al. | 705/37 |
| 2002/0198823 A1 | 12/2002 | Laederich et al. | |

(Continued)

FOREIGN PATENT DOCUMENTS

| | | | | |
|---|---|---|---|---|
| WO | WO 2007/127041 | * 11/2007 | | G06Q 40/00 |
| WO | WO 2008/132420 | * 11/2008 | | G06Q 40/00 |

OTHER PUBLICATIONS

Rijper et al.: High Frequency Trading, Dec. 2010, Optiver, The Netherlands, pp. 1-18.*

(Continued)

*Primary Examiner* — Bijendra K Shrestha
(74) *Attorney, Agent, or Firm* — Proskauer Rose LLP

(57) ABSTRACT

In a computerized trading system, at least one passive order from a liquidity provider is placed on a book of orders. An order received from a liquidity consumer is held for a holding period. During the holding period the order from the liquidity consumer is checked and information relating to the received order from the liquidity consumer is sent to eligible ones of one or more liquidity providers. If, during the holding period, changes to the orders on the book of orders are made by the liquidity providers, those orders are modified on the book and the book of orders is revised. Upon expiration of the holding period, the order from the liquidity consumer is matched with orders that remain on the book after any revisions.

24 Claims, 5 Drawing Sheets

(56) References Cited

U.S. PATENT DOCUMENTS

| | | |
|---|---|---|
| 2003/0225648 A1 | 12/2003 | Hylton |
| 2004/0143536 A1 | 7/2004 | Haberle |
| 2004/0186806 A1 | 9/2004 | Sinclair et al. |
| 2004/0199442 A1 | 10/2004 | Haberle |
| 2004/0254804 A1* | 12/2004 | Peterffy et al. .................. 705/1 |
| 2005/0171894 A1 | 8/2005 | Traynor |
| 2005/0216407 A1 | 9/2005 | Feldman et al. |
| 2006/0080192 A1 | 4/2006 | McCabe |
| 2006/0095361 A1 | 5/2006 | Rude |
| 2006/0111999 A1 | 5/2006 | Spirgel et al. |
| 2006/0218075 A1 | 9/2006 | Feldman et al. |
| 2007/0239584 A1 | 10/2007 | Fross et al. |
| 2008/0040256 A1 | 2/2008 | Neyman et al. |
| 2009/0063366 A1 | 3/2009 | Friedman et al. |
| 2009/0089223 A1 | 4/2009 | Dawson |
| 2009/0281911 A1* | 11/2009 | Sinclair et al. .................. 705/26 |
| 2010/0023457 A1 | 1/2010 | Riviere et al. |
| 2010/0076906 A1 | 3/2010 | Eubank et al. |
| 2010/0174664 A1 | 7/2010 | Kelly et al. |
| 2010/0332380 A1* | 12/2010 | Kemp et al. ..................... 705/37 |
| 2011/0137785 A1 | 6/2011 | Lutnick et al. |

OTHER PUBLICATIONS

Dowie, G: Trailing-Stop/Stop-Loss Combo Leads to Winning Trades, Jan. 10, 2010, Web Archives, Investopedia, pp. 1-7.*

WM/Reuters, "Spot & Forward Rates Methodology Guide," (C)2010 The WM Company, http://www.wmcompany.com/pdfs/WMReutersMethodology.pdf, retrieved Sep. 5, 2012, 13 pages.

Wm/Reuters, "Forward Rate Currencies and Time Periods," (C)2010 The WM Company, http://www.wmcompany.com/pdfs/ForwardCurrencyTimePeriods%20.pdf, retrieved Sep. 5, 2012, 3 pages.

WM/Reuters, "Inverted and Non-Inverted Currencies," (C)2010 The WM Company, http://www.wmcompany.com/pdfs/InvertedandNonInvertedCurrencies%20.pdf, retrieved Sep. 5, 2012, 2 pages.

WM/Reuters, "Spot Cross Calculations," (C)2010 The WM Company, http://www.wmcompany.com/pdfs/WMReutersCrossCalculations%20.pdf, retrieved Sep. 5, 2012, 2 pages.

WM/Reuters, "Forwards Cross Calculation (to a non-inverted currency)," (C)2010 The WM Company, http://www.wmcompany.com/pdfs/WMReutersForwardCrossCalculations%20.pdf, retrieved Sep. 5, 2012, 1 page.

WM/Reuters, "Spot Rates—Start &End Dates," (C)2010 The WM Company, http://www.wmcompany.com/pdfs/WMReutersSpotandForwardstartdates.pdf, retrieved Sep. 5, 2012, 3 pages.

WM/Reuters, "Closing Spot Rates," (C)2010 The WM Company, http://www.wmcompany.com/pdfs/Thomson-ReutersAllSpotForwardRatesConfiguration.pdf, retrieved Sep. 5, 2012, 4 pages.

WM/Reuters, "Accessing the WM/Reuters Rates via Bloomberg," (C)2010 The WM Company, http://www.wmcompany.com/pdfs/AccessingWMReutersRatesviaBloomberg%20.pdf, retrieved Sep. 5, 2012, 3 pages.

WM/Reuters, "Forward Rate NDF Currencies & Time Periods," (C)2010 The WM Company, http://www.wmcompany.com/pdfs/NDFForwardCurrencyTimePeriods.pdf, retrieved Sep. 5, 2012, 1 page.

WM/Reuters, "The WM/Reuters Closing NDF Rates," (C)2010 The WM Company, http://www.wmcompany.com/pdfs/Thomson-ReutersAllNDFRatesConfiguration.pdf, retrieved Sep. 5, 2012, 2 pages.

WM/Reuters, "History," 2010 The WM Company, (C)2010 The WM Company, http://www.wmcompany.com/wmr/Publications/WMReutersDocumentation/index.htm, retrieved Sep. 5, 2012, 3 pages.

Heather Bell, Deutsche Lists U.K's First Money Market ETFs, Apr. 21, 2008 (http://www.indexuniverse.com/sections/news/4003-deutsche-bank-lists-uks-first-money-market-etfs.html), 1 page.

David Fry, "Rydex Investments Euro Currency Trust: Retail Investors "Euro-Screwed"? (ETF: FXE)", Nov. 3, 2005 (http://seekingalpha.com/article/3968-rydex-investments-euro-currency-trust-retail-investors-euro-screwed-etf-fxe), 1 page.

"A Guide to Currency ETFs and ETNs" Februrary 28, 2010(http://seekingalpha.com/article/31129-a-guide-to-currency-etfs-and-etns), 3 pages.

"iPath's New Currency ETNs vs. CurrencyShares ETFs: Room for Both?" May 10, 2007 (http://seekingalpha.com/article/35128-ipaths-new-currency-etns-vs-currencyshares-etfs-room-for-both), 3 pages.

Ray Hendon, "The Birth of a Barclays Currency ETN" Sep. 11,2008)( http://seekingalpha.com/article/94956-the-birth-of-a-barclays-currency-etn), 5 pages.

"Wisdom Tree Dreyfus Currency Income ETFs" (http://www.wisdomtree.com/etfs/index-currency.asp), 2 pages.

"Wisdom Tree FAQs" (http://www.wisdomtree.com/about/faq-curr.asp), 2 pages.

"Move Over CurrencyShares: PowerShares Launches Two Currency ETFs" Feb. 20, 2007, 3 pages.

Sanajoy Banka, Foreign Currency Convertible Bonds, Nov. 2005, The Chartered Accountant, in Jan. 27, 2012 Office Action, 6 pages.

Notification of Transmittal of the International Search Report and the Written Opinion of the International Searching Authority, or the Declaration for International Application No. PCT/US2012/044941, date of mailing Sep. 11, 2012 (15 pages).

Notification of Transmittal of the International Search Report and the Written Opinion of the International Searching Authority, or the Declaration for International Application No. PCT/US2012/045247, date of mailing Sep. 10, 2012 (13 pages).

* cited by examiner

SYSTEMS AND METHODS FOR OPEN EXECUTION AUCTION TRADING OF FINANCIAL INSTRUMENTS

CROSS-REFERENCE TO RELATED APPLICATION

This application claims the benefit U.S. Provisional Application No. 61/503,833, filed Jul. 1, 2011, the entire contents of which are incorporated herein by reference.

FIELD OF THE INVENTION

The present invention relates to computer-implemented methods and systems for offering and trading financial instruments. More specifically, the present invention relates to computer-based and computer-implemented systems and methods for offering and trading financial instruments in an open execution auction with no "last-look" option. Although the present invention is described with regard to currency trading in the foreign exchange market, it will be apparent to persons skilled in the art that the present invention has broader applicability beyond the foreign exchange market, and could be applied to many other markets and transaction types.

BACKGROUND

Modern electronic trading systems have been developed for permitting electronic trading of various forms of securities. Electronic communications networks (ECNs) are electronic trading systems that can automatically match buy and sell orders at specified prices. Typically, such trading systems permit large institutions, such as banks and security dealers to electronically post limit orders, i.e., bid and ask prices, for tradable items. The presence on the trading system of such posted rates provides liquidity to the trading system to, in effect, "make the market." Thus, such participants are referred to as liquidity providers or market makers. Generally, the orders posted to the system by the liquidity providers are visible, persistent orders, that is, they are visible to other traders, and stay on the exchange's book of dealable orders until they are aggressed upon, i.e., hit or taken by liquidity consumers, unless they are withdrawn or modified before being hit or taken. In a typical scenario, the book of orders visible to consumers displays the available orders with the best available prices of remaining orders towards the top of the book.

Market makers orders that will be displayed in the system until the full quantity of the order is matched by one or more counter-orders and result in trade(s), or until the order is cancelled or modified by the market maker. Orders that are displayed on the order book are referred to as passive orders. Liquidity consumers have access to the book of orders currently on the system, for example via an electronic display showing all or part of the order book, the information of which is provided to the consumer by electronic communication with the trading system. Consumers can place orders that match with existing orders in the system. Orders are always matched at the passive order price, with earlier orders getting priority over the orders that come in later.

The currency market represents one of the world's largest financial markets. One reason investors purchase foreign currencies is to manage foreign exchange risk exposure. For example, United States residents going to visit a European country on vacation have the risk that if the Euro (EUR) appreciates against the United States Dollar (USD), their vacation will be more expensive. Exporters who sell products in foreign currency have the risk that if the value of that foreign currency falls, then the revenues in the exporter's home currency will be lower. An importer who buys goods priced in foreign currency has the risk that the foreign currency will appreciate and make the local currency cost greater than expected.

Fund managers and companies who own foreign assets are also regularly exposed to changes in currency exchange rates. For example, a mutual fund manager who purchases foreign securities in a foreign currency for a mutual fund that is traded in a home currency must take into account fluctuations in currency exchange rates in managing the assets of the mutual fund. A large number of investors also invest in foreign currencies for speculative purposes, i.e., to profit from accurately predicting changes in currency rates.

In every foreign exchange transaction, one currency is purchased and another currency is sold. The currencies that are purchased and sold in a foreign exchange transaction are also referred to as a currency pair. A currency pair consists of a base currency and a reference currency. EUR/USD is an example of a currency pair. In this example, the base currency is EUR and its value remains constant at one EUR. The reference currency is USD. The value of the reference currency fluctuates up and down relative to the base currency. For example, if the EUR/USD currency pair is quoted at 1.1500, it means that one EUR costs USD 1.1500. Likewise, if the EUR/USD currency pair increases to 1.2000, the same EUR is now equivalent to USD 1.2000.

Currency transactions can be quoted in one of two ways: American-terms, in which a currency is quoted in terms of the number of United States Dollar per unit of foreign currency (e.g., how many USD to buy 1 EUR), and in European-terms, in which one United States Dollar is quoted in terms of number of units of foreign currency per dollar (e.g., how many Euro to buy 1 USD). The same logic can be applied to currency pairs in which the USD is not one of the currencies. Either currency can be expressed in terms of the other. However there are generally accepted conventions in the interbank foreign exchange marketplace that have been adopted by most of the foreign exchange marketplace. For example, the EUR/USD pair is quoted in American Terms and the Swiss Franc is quoted in European Terms.

In currency trading, a long position refers to entering into a contract to buy a base currency in exchange for a set amount of reference currency at a set time in the future. A trader may speculate that the price of a base currency will increase relative to the value of the reference currency by entering into a long position. A short position in currency trading means that the trader has entered into a contract to sell a set amount of base currency in exchange for a set amount of reference currency. A trader may speculate that the price of a base currency will decrease relative to the value of the reference currency by entering into a short position.

Foreign exchange (FX) transactions are offered as FX spot transactions or FX forward transactions. FX spot transactions are exchanges of one currency for another for immediate delivery. FX spot transactions are conducted at an exchange rate for immediate delivery known as the spot rate. Immediate delivery in the spot market is generally two business days, which is called the value date. The two day settlement period is necessary to allow for trade processing and for currency payments to be wired around the world.

FX forward transactions are exchanges of one currency for another at a future date. FX forward transactions are conducted at a forward rate, which is the exchange rate available at the time of the purchase of the FX forward transaction for exchanging currency at some specified date in the future. The forward rate is a function of both the spot rate and the difference in interest rates that could be earned in money markets or bond markets in the respective two countries. The difference between a forward exchange rate and a spot exchange rate represents the benefit or disadvantage an investor would experience should they convert in the spot market from one currency represented in the pair to the other and hold the new currency earning interest at a risk free rate. To the extent that there is an economic advantage associated with a higher interest rate in the new currency, such advantage is reflected in the price of the FX forward transaction. The discount or premium to the spot price in an FX forward transaction of the same pair is typically referred to as the "carry" or "cost of carry."

The foreign exchange market operates five days per week on a 24-hour trade date basis beginning at 5 p.m. Eastern Standard Time (EST) Sunday. A trading day begins at 5 p.m. EST and ending the next day at 5 p.m. EST. For example, on a Monday, spot currencies are trading for value on Wednesday (assuming no holidays). At 5 p.m. EST on Monday, the trade date becomes Tuesday and the value date becomes Thursday. A position opened on Monday at 5 p.m. EST is either closed or rolled over to the next value date before the end of trading day on Tuesday. In this example, a one-day rollover involves the open position being rolled over from a value date of Wednesday to that of Thursday.

Rollover transactions are effectuated by making two offsetting trades that result in the same open position. However, when making rollover transactions, the rate at which a currency pair is quoted can change. These changes represent the difference in interest rates between the two currencies in the trader's open position applied in currency-rate terms (i.e., one day of "carry" or "cost of carry"). They constitute net interest earned or paid by the trader, depending on the direction of the trader's position. Assuming there is no change in the spot exchange rate for the currency pair, a trader can earn money in a rollover transaction if the trader holds a long position in the currency with the higher interest rate and holds a short position in the currency with the lower interest rate. Conversely, a trader can lose money in a rollover transaction if the trader holds a short position in the currency with the higher interest rate and holds a long position in the currency with the lower interest rate.

Exchange traded funds (ETFs) offer public investors an undivided interest in a pool of securities or other assets and thus are similar in many ways to traditional mutual funds, except that shares in an ETF can be bought and sold throughout the day like stocks on a securities exchange through a broker-dealer. Unlike traditional mutual funds, traders and investors participating in a secondary market can buy and sell ETFs without having to redeem their individual shares at net asset value, or NAV. Instead, financial institutions or other qualified investors purchase and redeem ETF shares directly from the ETF in the primary market, but only in large blocks. In the case of currency ETFs, financial institutions or other qualified investors convert currency holdings to shares that trade in a publicly tradeable marketplace. It is recognized these have been developed and are substantially different from embodiments of the present invention.

In 2005, Rydex Investments launched the first ever currency ETF called the Euro Currency Trust (NYSE: FXE) in New York. Since then Rydex has launched a series of funds tracking all major currencies under their brand Currency-Shares. In 2008, Deutsche Bank's db x-trackers launched Sterling Money Market ETF (LSE: XGBP) and US Dollar Money Market ETF (LSE: XUSD) in London.

Currency ETFs do not require rollover transactions to maintain currency positions, but they have disadvantages inherent in their structure. Currency ETF shares are priced to the foreign exchange rate plus interest, which creates tracking error from the currency price being traded. They also do not trade on the 24 hour per day trading cycle of the foreign exchange markets and are therefore more difficult to redeem. They also are quoted in a convention not consistent with the interbank market and with settlement periods not consistent with the foreign exchange interbank market. For this reason, they may have a value that may track the value of currency but cannot be considered fungible with spot FX contracts or forward contracts. Their lack of fungibility means they suffer from far less volume, less institutional participation in trading and price discovery and have greater risk of price tracking error Inherently, Currency ETFs are not an efficient vehicle to trade currencies or baskets of currencies as a security.

Currency ETFs also have disadvantages in the way that interest is paid. With currency ETFs, interest is earned in a reference currency and then converted into the base currency at some unknown rate close in time to the date on which dividends are paid (typically monthly) and then distributed to shareholders, which exposes currency ETF investors to additional foreign currency exposure on accrued interest.

There are also currency Exchange Traded Notes (ETNs) that have been developed. ETNs are debt securities backed by an issuer that are designed to provide investors access to returns of various benchmarks. Though linked to the performance of a market benchmark, ETNs are not equities or index funds, but they do share several characteristics of the latter. Similar to equities, they are traded on an exchange and can be shorted. Similar to index fund, they are linked to the return of a benchmark index. But as debt securities, ETNs do not actually own anything they are tracking.

There are currency ETNs that have been developed to attempt to provide investors with returns of certain currency benchmarks. But currency ETNs are subject to risk of default by the issuing bank as counter party. Currency ETNs also share many of the same disadvantages of currency ETFs, including that currency ETNs have disadvantages in the way that interest is paid and the way it is included in the price of the instrument making it more difficult for the trader to determine the accuracy of the instruments' tracking of the value of underlying assets, they are more difficult to redeem (they can be redeemed only in the primary market), and are not fungible with FX spot and forward transactions. This is due to the fact that an ETN is redeemable in the primary market for an amount equal to an index—making the ETN very accurate at tracking the index but this index may temporarily diverge in value from the underlying asset it seeks to track thus marking it more difficult to arbitrage price to the actual underlying asset. To effect such a price arbitrage, the trader would have to add an extra step of arbitraging the price of the index to the underlying assets it seeks to track thus adding complexity and cost to the process.

The global FX marketplace is estimated to transact over four trillion USD per day. Much of that volume is concentrated on a few pairs such as the EUR/USD, and USD/Japanese Yen. Rather than one centralized regulated marketplace, the global FX market consists of many fragmented, unregulated, over-the-counter pools of liquidity which can range from a single counterparty-to-counterparty market to a pool of liquidity providers competing for order flow from liquidity takers in an electronic order matching electronic network. The nature of the fragmentation of the global FX marketplace means it is possible that a single currency pair can trade at different prices, in different markets at the same time. It is desirable for the purpose of price transparency, liquidity and market confidence to provide methods and systems to attract traders for purpose of transparent price discovery and to add liquidity to the global FX marketplace, especially in currency pairs that do not enjoy the liquidity that exists in major currency pairs such as that of the US Dollar, Euro and Japanese Yen.

In the foreign exchange market, there are many liquidity pools each comprising an electronic communications network (ECN) operated based on credit and trading relationships. These pools may be created and sponsored by liquidity providers, for example, market makers that are sizable holders of positions in particular currencies that facilitate the trading of those currencies to investors seeking to transact in currencies, who are liquidity consumers. These liquidity pools by definition have built-in biases.

As discussed above, liquidity providers are sometimes referred to as market makers because they "make the market" by providing persistent orders, i.e., passive orders that rest on the book of orders (i.e., the record of unexecuted limit orders placed on the system), and which are visible to at least some traders on the trading system that corresponds to the liquidity pool. The terms "liquidity provider" and "market maker" will be used interchangeably throughout this description.

In the present application "orders" will be used to refer generally to submissions of either bid or ask prices, each of which is a type of order. Liquidity consumers, sometimes referred to as "market participants," react to orders visible to them, e.g., on trading terminals, by submitting aggressive orders hoping to hit or take the orders they see on their terminal. An aggressive order submitted by a liquidity consumer is sometimes referred to as an "invisible" order, because unlike a passive order from a liquidity provider, an aggressive order generally will not become part of the book of orders visible to traders, although an ECN's rules may permit market participants to submit passive orders to the system as well.

Because circumstances may change between the time a liquidity provider's order appears on the order book and the time at which the order is hit or taken by a liquidity consumer, the liquidity provider is vulnerable to changes that may worsen its position with respect to the market during that period of time. For example, prices in the overall market may undergo rapid changes in one direction or the other, such that the previously submitted orders, if hit or taken by a liquidity consumer, would result in a disadvantageous transaction for the liquidity provider.

Thus, if a liquidity provider believes that the price of a security is about to go up, the provider may wish to, e.g., cancel its sell order at, say, $20 and raise it to $20.10. Moreover, liquidity providers wish to participate in a market place with customers with legitimate trading interests, customers that would not try to manipulate the market or try to run latency arbitrage models. Liquidity providers also wish to protect themselves against high frequency trading shops. To provide protection to liquidity providers from these disadvantageous occurrences, and to persuade them to participate, it is common in spot foreign exchange trading systems for liquidity providers to be provided with a "last look" option where liquidity consumers have to submit trade requests based on a tradable price published by a liquidity provider, but must give the liquidity provider a chance to accept or reject the trade.

While the last look option may be in the interests of liquidity providers, from the point of view of the liquidity consumer, a system that implements a "last look" functionality might not be considered optimal. Liquidity consumers are seeking a market place in which published prices are executable, verifiable and sufficient liquidity is available at all times. To the liquidity consumer, the ability of the liquidity provider to renege on an order after it has been hit or taken by the liquidity consumer can result in a "pricing mirage" in which, in spite of the fact that a price was published, the consumer may not actually have the opportunity to trade on that price. This can result in consumer uncertainty, wasted time, and possible missed opportunities, in placing orders that are never executed.

In order to ameliorate some of the perceived disadvantages of the last look, trading systems such as Currenex and HotspotFX permit consumers to filter out from their visible book of orders any orders placed by liquidity providers that are permitted to execute a last look. However, while this removes some of the disadvantages, at least from the point of view of the liquidity consumer, of the "last look," it is in effect a "band-aid" approach to solving the problem that does not take into account the legitimate concerns of all parties involved. In addition, since most of the liquidity providers opt to have the last look option, filtering these orders out would leave a liquidity consumer with limited available liquidity at best, or with no available liquidity at all. Also, liquidity providers that do provide liquidity without the last look option tend to do so with less consistency and either remove their prices or increase the spreads between the bid and offer orders they post at the time of high volatility in the market.

Thus, there exists a need for a trading system that provides liquidity providers with a way of ameliorating their risks while at the same time permitting transparent and efficient trading for consumers.

SUMMARY

Embodiments of the claimed invention provide for an open, no-last-look liquidity pool with transparent and disclosed rules can be established where both liquidity providers and liquidity consumers will benefit and will be protected from abuse and manipulation. Access to such pool will be governed by, among other things, credit worthiness of the participants and adherence to the pool rules for both liquidity providers and liquidity consumers. In a preferred embodiment, the credit to trade in the pool can be obtained from one of the pool's clearing agents or prime brokers. The process of obtaining such credit will again be transparent and straight forward. Preferably, the process of obtaining such credit will be based not on relationship, but on the objective credit worthiness of participants.

In accordance with aspects of the present invention, the pool will be governed by specific rules set for both liquidity providers and liquidity consumers that will govern all aspects of trading and order processing. These rules are designed to establish an open and democratic trading environment.

In accordance with a first aspect of the present invention, there is provided a computerized method for providing open execution auction trading of financial instruments on a computerized trading system having one or more server computers. The method comprises: receiving, at at least one of the server computers of the trading system, one or more communications from one or more liquidity providers, each communication including at least one passive order, including at least a price, and putting the received at least one passive order on a book of orders available for trading that can be viewed by participants of the trading system; receiving, at least one of the server computers of the trading system, an order, including at least a price, from a liquidity consumer, and, in response to receipt of the order from the liquidity consumer, initiating a holding period during which the order from the liquidity consumer is held without being forwarded for matching with other orders on the book of orders; during the holding period, performing checks on the order from the liquidity consumer; during the holding period, sending information relating to the received order from the liquidity consumer to eligible ones of the one or more liquidity providers; during the holding period, if changes to the one or more orders on the book of orders are received from the liquidity providers, modifying the one or more orders on the book of orders and revising the book of orders to reflect the modification; upon expiration of the holding period, passing the order from the liquidity consumer to a matching engine server for matching with orders that remain on the book of orders after any revisions to the book of orders; and matching, at the matching engine server, the order received from the liquidity consumer with a matching order on the book of orders to execute a trade.

In another aspect, the changes that can be requested by the liquidity provider during the holding period include modifying the price of an order and cancelling the order.

In another aspect, the information relating to the received order that is sent to the eligible liquidity provider includes information as to the price of the received order.

In another aspect, the method further comprises the step of, during the holding period, sending, to eligible ones of the one or more liquidity providers, information relating to the position in the book of orders of one or more passive orders of the liquidity provider.

In another aspect, the duration of the holding period is set at random, between minimum and maximum duration parameters, before receiving the order from the liquidity consumer.

In another aspect, the method further comprises sending order confirmations to all parties of an executed trade.

In another aspect, the checks performed on the order received from the liquidity consumer include a credit check.

In another aspect, the credit checks are performed using one or more prime brokers.

In another aspect, if, after the expiration of the holding period, no match can be found for the order from the liquidity provider, the order is placed on the book of orders so as to be eligible to be matched with an order subsequently received from other liquidity consumers or from a liquidity provider.

In accordance with a second aspect of the present invention, there is provided a computerized trading system having one or more server computers, respective ones of the one or more server computers being configured and programmed to: receive, at at least one of the server computers of the trading system, one or more communications from one or more liquidity providers, each communication including at least one passive order, including at least a price, and put the received at least one passive order on a book of orders available for trading that can be viewed by participants of the trading system; receive, at at least one of the server computers of the trading system, an order, including at least a price, from a liquidity consumer, and, in response to receipt of the order from the liquidity consumer, initiate a holding period during which the order from the liquidity consumer is held without being forwarded for matching with other orders on the book of orders; during the holding period, perform checks on the order from the liquidity consumer; during the holding period, send information relating to the received order from the liquidity consumer to eligible ones of the one or more liquidity providers; during the holding period, if changes to the one or more orders on the book of orders are received from the liquidity providers, modify the one or more orders on the book of orders and revise the book of orders to reflect the modification; upon expiration of the holding period, pass the order from the liquidity consumer to a server of the trading system having a matching function for matching with orders that remain on the book of orders after any revisions to the book of orders; and match, at the server with the matching function, the order received from the liquidity consumer with a matching order on the book of orders to execute a trade.

In another aspect, the changes that can be requested by the liquidity provider during the holding period include modifying the price of an order and cancelling the order.

In another aspect, the information relating to the received order that is sent to the eligible liquidity provider includes information as to the price of the received order.

In another aspect, the respective ones of the one or more server computers are configured and programmed to during the holding period, send, to eligible ones of the one or more liquidity providers, information relating to the position in the book of orders of one or more passive orders of the liquidity provider.

In another aspect, the duration of the holding period is set at random, between minimum and maximum duration parameters, before receiving the order from the liquidity consumer.

In another aspect, order confirmations are sent to all parties of an executed trade.

In another aspect, the checks performed on the order received from the liquidity consumer include a credit check.

In another aspect, the credit checks are performed using one or more prime brokers.

In another aspect, if, after the expiration of the holding period, no match can be found for the order from the liquidity provider, the order is placed on the book of orders so as to be eligible to be matched with an order subsequently received from other liquidity consumers or from a liquidity provider.

In another aspect, the server performing the matching function includes an offer server that processes received offers for matching, and a bid server, that processed received bids for matching.

In another aspect, the computerized trading system further comprises an index engine server that receives all information from the book of orders and from all executed orders and generates price indices indicative of the state of the market at any given point in time.

In accordance with a third aspect of the present invention, there is provided a computerized method for providing open execution auction trading of financial instruments on a computerized trading system having one or more server computers. The method comprises: receiving, at at least one of the server computers of the trading system, one or more communications from one or more market participants of a first class, each communication including at least one passive order, including at least a price, and, after expiration of a holding period, putting the received at least one passive order on a book of orders available for trading that can be viewed by participants of the trading system; receiving, at least one of the server computers of the trading system, an order, including at least a price, from a market participant of a second class, and, in response to receipt of the order from the market participant of the second class, initiating a holding period during which the order from the market participant of a second class is held without being forwarded for matching with other orders on the book of orders; during the holding period, performing checks on the an order the receipt of which triggered a holding period; during the holding period, sending information relating to the received orders to eligible ones of market participants of the first or second class; during the holding period, if changes to the one or more orders on the book of orders are received from market participants of the first or second class, modifying the one or more orders on the book of orders and revising the book of orders to reflect the modification; upon expiration of the holding period, passing the held order to a matching engine server for matching with orders that remain on the book of orders after any revisions to the book of orders; and matching, at the matching engine server, the previously held order with a matching order on the book of orders to execute a trade.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
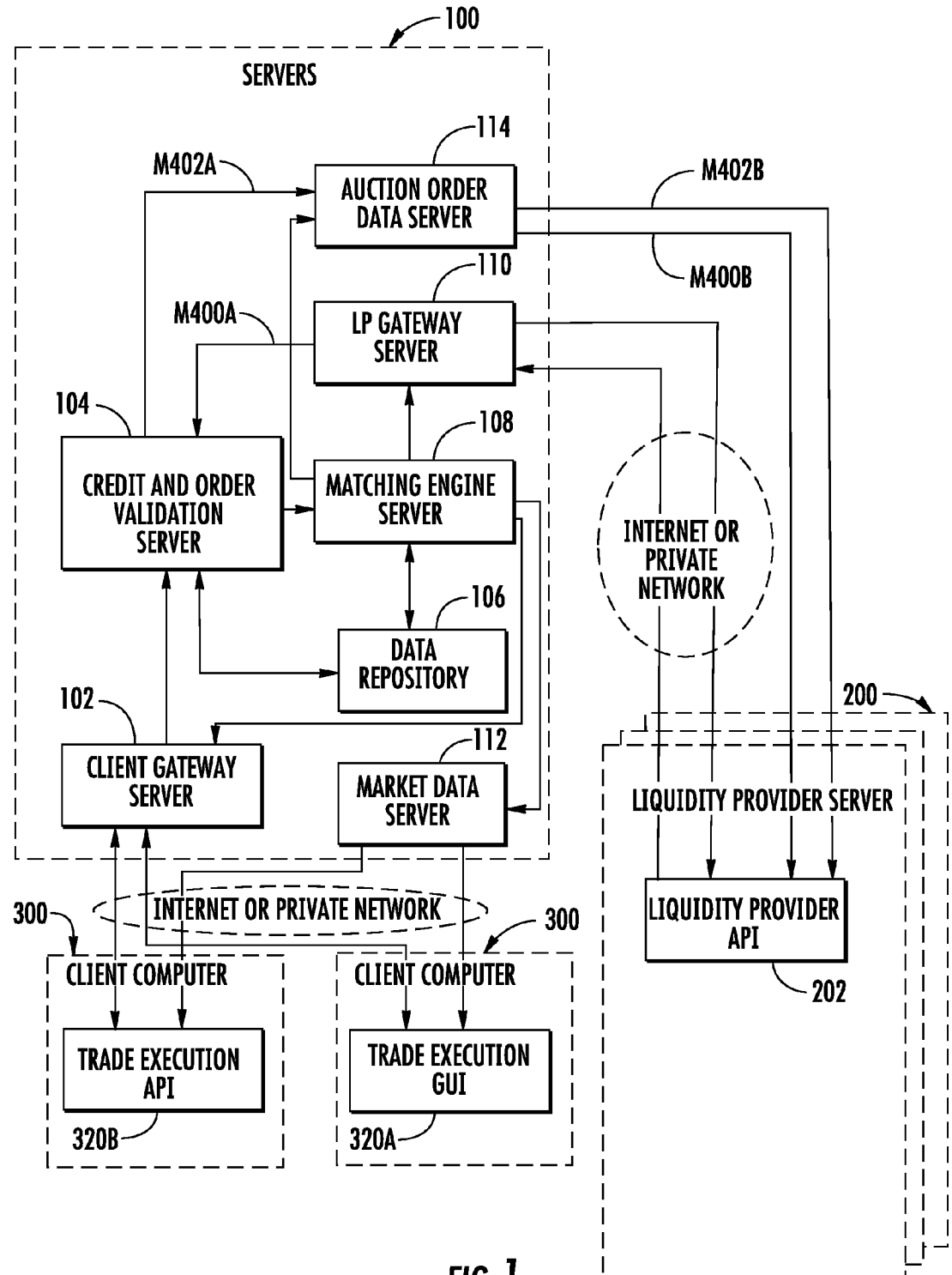
FIG. 1 is a block diagram illustrating structural components of an electronic trading system, according to one embodiment.

FIG. 1 is a diagram illustrating the entities involved in a trade in accordance with the present invention. Trading system 100 is a computerized electronic communications network (ECN) comprising one or more computers programmed to perform the methods for trading described herein. The trading system 100 facilitates buyers and sellers electronically submitting orders and trading with each other.

In accordance with an embodiment of the present invention, the trading system 100 includes a client gateway server 102, which is configured and programmed to receive all orders from liquidity consumer terminals 300. The gateway 102 also receives all trade execution confirmations from the matching engine server 108 and forwards these confirmations to the liquidity consumer terminals 300.

In accordance with an embodiment of the present invention, the trading system 100 also includes a liquidity provider gateway server 110, which is configured and programmed to receive all orders from liquidity provider server 200. The liquidity provider gateway server 110 also receives all trade execution confirmations from the matching engine server 108 and forwards these confirmations to the liquidity provider server 200.

In accordance with an embodiment of the present invention, the trading system 100 also includes a Market Data Server 112, which is configured and programmed to receive all orders published on the Matching Engine and forward these orders to all liquidity consumers that subscribe to receive these orders, providing liquidity consumers with access to the order book on the ECN 100.

The credit and order validation server (validation server) 104 validates all orders submitted to the ECN 100; and checks available credit prior to executing the order.

The validation server 104 also holds incoming orders received from liquidity consumer during a holding period, to be discussed in detail below, while performing all required validations and checks, including credit checks. Once the holding period for a given order had expired, the validation server submits the order to the matching engine server 108 for matching. Credit checking in accordance with the present invention can be done in any known manner, including but not limited to, making reference to information provided from potential counterparties, e.g., in the form of a bilateral yes/no matrix, or the like, or bilateral credit information stored in the system 100 itself or from clearing agents or prime brokers having a relationship with the system 100. However, the exact manner of credit checking does not form a part of the present invention.

A messaging platform, a hardware and software implementation of the communication process between all server components, is preferably utilized, so that all communication, all messages sent between all the components of system 100 are implemented via the messaging platform. These messages are illustrated on FIG. 1 by all the arrows inside the system 100. Also, the messaging platform is preferably used to send messages between different components of the servers. For instance, the credit and order validation server 104 will preferably included a number of modules that will communicate with each other using the messaging platform.

The held (auction) order data server 114 is configured and programmed to receive information regarding all liquidity consumer orders received and held by the credit and order validation server 104. Messages M400B and M402B will be forwarded to all qualified liquidity providers that subscribe to receive such information, as described in greater detail below.

The matching engine server 108 is a module of the ECN 100 in which buy and sell orders are processed and matched for execution. The matching engine server 108 maintains books of eligible orders and matches orders to buy and orders to sell based only on price, amount of the order, available credit between the counter parties and the time the order was presented to the matching engine server 108. As will be discussed in more detail below, because the liquidity provider will not be provided with a "last look," option, when the matching engine server 108 identifies a match between an order to buy and an order to sell, it will perform that match and then send trade confirmations to both parties involved. Such a match is final, and the parties to the trade cannot renege, or cancel this trade.

The data repository 106 holds all the information required for the system 100 to function. For example, it holds all relevant information for each trading account, including deposits and or credit or margin information, information about all the trades (already executed and those resting on the order book), information related to all executions, counter parties, clearing agent, transaction fees, etc. Account and order information in the data repository is referenced by the validation server 104 in validating liquidity consumer orders.

While the data repository 106 is represented in the figures as an individual unit, the invention is not limited to the use of a single standalone data store. For example, the data repository may comprise one or more distributed data storage systems or devices operating together, and which may be able to access information stored at various locations, for example, by accessing such information over public and/or private networks, such as the cloud.

The liquidity provider server 200 comprises one or more computers at the market maker side. The server 200 may, for example, utilize a liquidity provider API 202 to perform the logic, communications and display functions required, e.g., for the liquidity provider to interact with, place orders with, and receive status information from, the trading system 100. The liquidity provider is permitted to make two sided or one sided markets, submitting both bids and offers at each time, or just bids, or just offers, as they see fit.

Each liquidity consumer (or customer) typically has a liquidity consumer computer 300 having at least one terminal (e.g., work station). Hereafter, both the consumer himself and the trader terminal (computer) will be referred to generally using the reference numeral 300. The liquidity consumer computer 300 is programmed to present in real time an order entry graphical user interface (GUI) 320A or application programming interface (API) 320B or to receive in real time a GUI or API with data that the gateway server 102 is programmed to process and present to the liquidity consumer computer 300.

As will be described in more detail below, in accordance with an aspect of the present invention, each order received from a liquidity consumer 300 will be held by the validation server 104 for a predetermined period of time ("holding period") prior to it being presented to the matching engine server 108 for a match. The liquidity consumer may cancel any order any time (subject to any time to live parameter (TTL) requirement that may be in effect, as discussed below) before the order is matched on the matching engine server.

The above-described system as represented in FIG. 1, and the other structures described hereinafter, can be implemented in digital electronic circuitry, or in computer hardware, firmware, software, or in combinations of them. The implementation can be as a computer program product, e.g., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network and messaging platform.

Method steps as described herein can be performed by one or more programmable processors executing a computer program to perform functions of the invention by operating on input data and generating output. Method steps can also be performed by, and apparatus can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Machine readable storage devices suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, mean, but are not limited to, a software or hardware component which performs certain tasks. A module may advantageously be configured to reside on addressable storage medium and configured to execute on one or more processors. A module may be fully or partially implemented with a general purpose integrated circuit ("IC"), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges ("PBX"). In any of these cases, implementation may be achieved either by writing applications that are native to the chosen platform, or by interfacing the platform to one or more external application engines.

To provide for interaction with a consumer, consumer terminals 300, and any terminals that may be associated with the liquidity provider servers 200, can be computers having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition or alternatively, a Trade Execution API can be connected to customer's Order Management System (OMS) where trade orders can be initiated and information returned from the gateway 102 can be displayed.

The above described system can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components.

The components of the system described above can be interconnected by any form or medium of digital data communications, e.g., a communications network. Examples of communication networks, also referred to as communications channels include a local area network ("LAN") and a wide area network ("WAN"), e.g., the Internet, and include both wired and wireless networks. Unless clearly indicated otherwise, communications networks can also include all or a portion of the PSTN, for example, a portion owned by a specific carrier.

The computing system of FIG. 1 as described above includes clients and servers. A client and server are generally remote from each other and typically interact through a communication network. The relationship of client and server arises by virtue of computer programs running on the respective computers and having a client-server relationship to each other, communicating using standard communication messages understood by both clients and servers.

An exemplary embodiment of a method and system for trading securities in accordance with the present invention will next be described with reference to FIGS. 1 and 2.

In the implementation of the trading system 100 according to a first embodiment of the present invention, the liquidity providers 200 will not be provided with a last look option. However, to provide protection for the liquidity provider from the disadvantages and risks discussed above, each order from a liquidity consumer 300 is held for a predetermined period of time in the validation server 104 before it is forwarded to the matching engine server 108 for matching with orders in the order book.

According to the first embodiment, while each order from a liquidity consumer is being held, information about such orders is broadcasted, i.e., forwarded, via a pending orders advance notice message M402B in FIG. 1, preferably anonymously, to all qualified liquidity providers, informing such providers of each order coming up for a match. As will be described in more detail below, liquidity providers preferably also have the option to receive liquidity provider book position messages M400B specifying the positions of their orders in the trading book, for example, to let them know that their order is near or at the top of the book and very likely to be hit or taken soon.

The holding of the orders from liquidity consumers and the broadcasting of information about the orders to eligible liquidity providers that might be interested in the orders creates an auction environment in which liquidity providers could compete with one another for each liquidity consumer's order.

Using the information in messages M400B and M402B, liquidity provider(s) can determine if they are interested in taking the upcoming customer order and how likely they are to execute this order. Furthermore, a liquidity provider can choose to modify their existing order(s) to improve their chances of executing an upcoming customer order or may choose to cancel their existing order or modify it, moving away from the customer order level. The presence of the holding period, and availability of the information as to positions of liquidity providers' orders in the trading book, allows the liquidity providers to, during the holding period: (a) adjust the prices they have published to the matching engine, increasing or decreasing their chances to be matched against specified customer orders, for example by making their prices more or less aggressive in relation to the upcoming order; or (b) cancel their prices, removing themselves from the auction. Internal messages M400A and M402A correspond to external messages M400B and M402B, respectively.

In accordance with the first embodiment, at the end of the holding period the liquidity consumer order is released from the validation server 104 to the matching engine server 108 for matching, at which time the order is matched against all available liquidity in the liquidity pool. In particular, the orders at that time are matched in the matching engine server 108 with orders on the book, with no last look provision. All the orders in the book are organized based on the price of the order and are processed on the First Come First Served basis. That is, after the holding period, the liquidity providers do not have the opportunity to change or cancel their related orders, i.e., no "last look" is provided. Once the orders are so matched, trade confirmations are reported to both parties to the trade and settlement will follow in due course, and account and order information is updated in the data repository 106.

In a preferred implementation of the ECN in accordance with the first embodiment, the rules under which liquidity providers and liquidity consumers operate in the system and method of the present invention are summarized as follows:

Liquidity consumers will see all available liquidity and all orders submitted for execution, and both can be passive and aggressive participants of this pool, effectively adding liquidity to the pool or taking liquidity from this pool.

In accordance with the first embodiment, liquidity consumers will trade based on the following rules:

Orders from a liquidity consumer can be matched against any order from another liquidity consumer and or from liquidity providers;

Every order from a liquidity consumer will be held by the system for the holding period before the matching engine server will attempt to match this order against available liquidity and add this order to the order book; the predetermined time period constituting the holding period is preferably set long enough to provide sufficient time to broadcast the order to those eligible to receive the order;

Liquidity consumers can cancel a resting (passive) order without any delay, (subject to any time to live parameter (TTL) requirement that may be in effect, as discussed below);

All orders from liquidity consumers are subject to the time-to-live rule. Where each order from a liquidity consumer has to stay in the matching engine for the time interval specified as the time-to-live parameter before it can be canceled by the consumer.

The liquidity consumer modifying any resting order constitutes canceling existing order (without delay) and placing a new order (which would have to go through a standard new order holding period process).

In accordance with the first embodiment liquidity providers will trade based on the following rules:

Orders from a liquidity provider can be matched only against an order from a liquidity consumer and will never be matched against orders of other liquidity providers that is, liquidity providers are not permitted to trade with other liquidity providers;

There will be no "last look" provision, i.e., the liquidity provider will not have the opportunity to renege on a trade once it is matched, as described above.

Liquidity providers will not be subject to the time-to-live rule.

With regard to the messages M400B and M402B discussed above with reference to FIG. 1:

When the system 100 receives orders from liquidity consumers, information about these orders will be broadcast to all qualified liquidity providers who subscribe to receive such information.

Preferably, eligibility rules will be established to control who can receive such messages.

Liquidity providers will be able to adjust or cancel their prices during the Holding period;

Any modification of price by the liquidity provider will result in the provider losing its position in the order book of prices eligible to be matched against the pending liquidity consumer order;

In the course of operations of the system 100, the system 100 preferably monitors how many times a liquidity provider cancelled its orders, improved or made its prices worse. This information may be used as one parameter in determining the liquidity provider's eligibility to receive these advance notices in the future.

With regard to receipt of messages M400B specifying the liquidity provider's book position, the following rules preferably apply:

In addition to a pending orders advance notice message M402B to permit modification/cancellation of orders during the holding period, liquidity providers can preferably subscribe to receive a liquidity provider book position message M400B. This message informs the liquidity provider where its orders stand in the order book.

Preferably, a financial institution that wishes to trade on the system 100 will have to satisfy some requirements to become liquidity providers. Examples of such requirements are:

Price feed requirements:

Time—minimum amount of time liquidity providers have to have a price published over the course of a day, week, month;

Price making could be required to be one-sided or two-sided or permitted to be both;

Price amount—liquidity providers will be required to publish their own orders for the amount agreed by with ECN administrator.

Price relevance—prices made by a liquidity provider could be required to be competitive (e.g., within a predetermined number of points from the top of the order book), i.e. with regard to two sided price requirements, market makers should not be posting, for example, orders having a 200 pip wide price spread between their bid and offer prices if current spread on the system is 5 pips.

The trading system 100 preferably monitors the number of times a liquidity provider cancels its existing orders to avoid executing customer orders. If liquidity providers cancel their own orders too many times, for example, 10 times during one day they will be penalized, for example by no longer being eligible to receive incoming holding order notices.

Qualifications for liquidity providers to be eligible to receive advance notices M400B or M402B preferably include:

All liquidity providers could receive messages concerning too many cancellations. Alternatively, only the top 3 or 5 liquidity providers would receive messages concerning too many order cancellations.

Liquidity providers could be required to have bids and offers in the market at the time of the notice.

The types of information in the notice message may preferably include: an indication of how close to the top of the book the liquidity provider's prices are; whether the system need additional prices (additional amount) from liquidity providers to fill incoming order; an indication of the statistics of this liquidity provider in relation to canceling, improving or worsening their offerings.

The interaction between components in executing the method described above would, in accordance with the first embodiment of the present invention, be implemented in the following manner, making reference to the diagram of FIG. 3.

Figure 2:
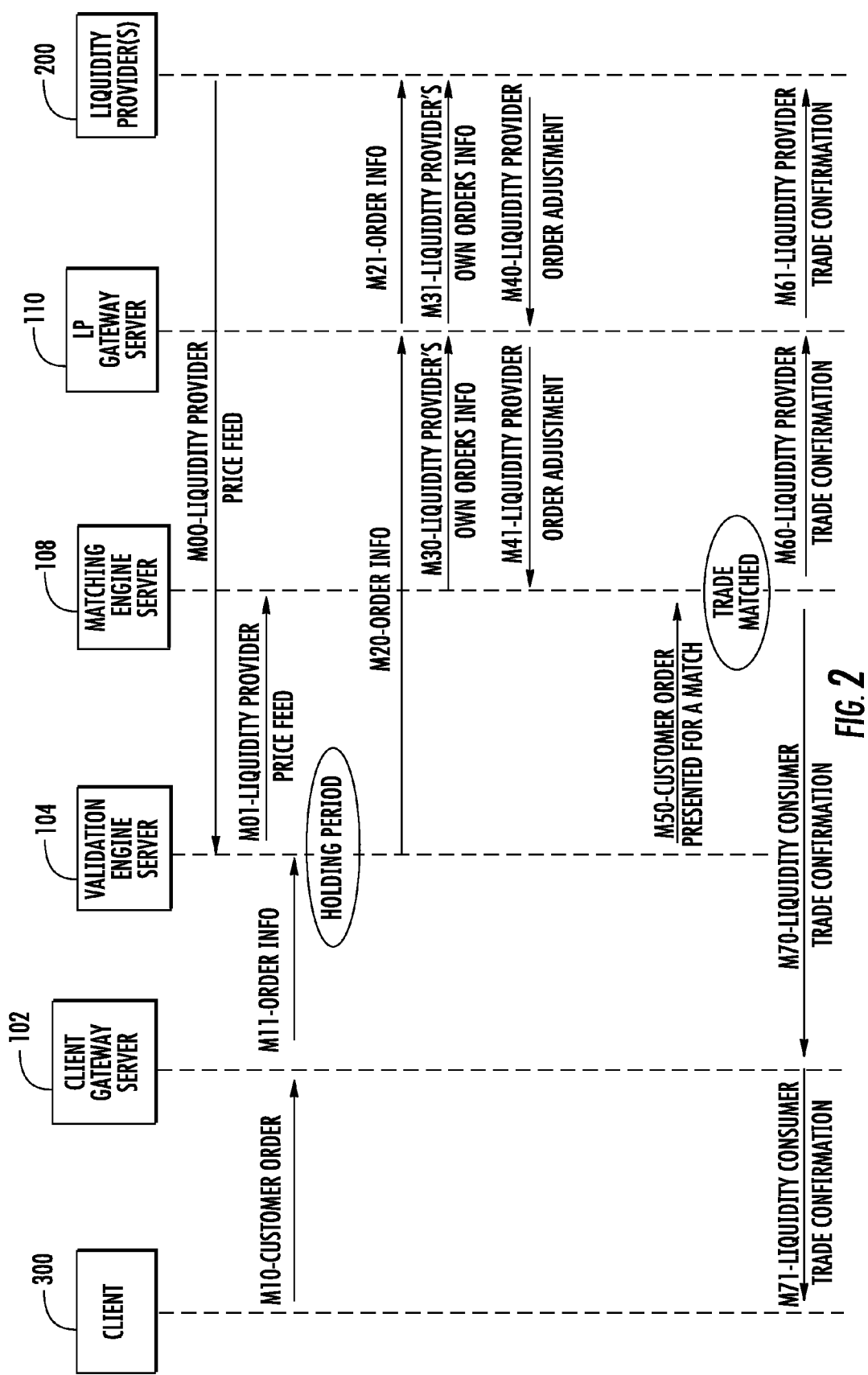
FIG. 2 is a diagram illustrating the message flow that occurs for a trade in accordance with one embodiment.

With reference to FIG. 2, the process is initiated by receipt of the order from that customer at client gateway server via message M10 from client computer system 300, via the Internet or any other network connected to the client gateway server 102. In response to receipt of the order, the gateway server 102 forwards the information received in message M10 to the validation server 104 via an M11 message, at which point, or shortly thereafter, the holding period commences. At the start of the holding period, the customer order information is broadcast/forwarded to all eligible liquidity providers (M20 and M21 messages, which corresponds to the pending orders advance notice message M402 discussed above).

The matching engine 108 will also forward to each eligible liquidity provider 200 an M30 message with information specifying position of their orders in the overall liquidity book available on the matching engine (corresponding to the liquidity provider book position message M400 discussed above).

Liquidity provider 200 then uses the information in messages M20 and M30 to determine if they want to make any changes in the prices they have published on the matching engine server 108 to increase or decrease their chances of matching against the customer order. A liquidity provider order adjustment message M40 is used to adjust or cancel their previously published prices (M00.)

Upon expiration of the holding period and if the customer order has passed all necessary validations, such as, e.g., credit verification, the customer order is forwarded from the validation server 104 to the matching engine server 108 via an order information message M50. Once the customer order is received by the matching engine server 108, the matching engine server 108 will attempt to match this new order against prices or orders from other liquidity consumers and liquidity providers existing on the matching server at that time.

If there is no match at this time, the new order will join the book and will stay in the book until it is matched against incoming orders or until it is cancelled. If order is matched system will book the trade without any additional confirmations or last look provisions and will send trade confirmations to both parties to this transaction (messages M60/61 and M70/71).

In accordance with a first embodiment of the present invention, each order received from a liquidity consumer is held for a predetermined period of time (the holding period) before being forwarded to the matching engine server. In an advantageous variation of the first embodiment, a time-to-live (TTL) parameter is utilized.

The TTL is a time period defined as a minimum time an order has to stay in the matching engine available for a match before it can be canceled. In this variation of the first embodiment, orders from liquidity providers will not have a TTL, but orders from liquidity consumer will have a TTL. That is, once an order from the liquidity consumer has been forwarded to the matching engine, after expiration of the holding period, the liquidity consumer's order can still be cancelled at any time without delay, but only provided the TTL has expired.

With regard to the first embodiment, the holding period preferably is determined based on Min and Max Time Holding parameters, which are upper and lower limits of the range of the holding period. Preferably the actual duration of the holding period is set randomly, within the Min and Max Time Holding parameters. For each incoming order from liquidity consumers the order holding period will be calculated prior to receiving the customer order. This number will be available for the liquidity pool auditing process.

As part of this invention all the information about order processing by the ECN will preferably be available for auditing and verification to an independent third party, where such independent party can verify that all the trading and order processing has been performed in accordance with rules established and published for this Liquidity Pool (ECN). For instance, the independent third party will preferably be able to verify that holding periods for each order were random and within the Min and Max Time Holding parameters.

As discussed above, during the holding period, while orders are being held, information about the orders will be broadcast/forwarded (preferably anonymously) to all qualified liquidity providers, informing the providers of each order coming up for a match. Preferably, qualified participants will have to subscribe to receive such messages. Liquidity providers preferably will not be given the exact time when the incoming customer's orders will be submitted to the matching engine server. Instead, liquidity providers will have to estimate when the customer order will be published, for example using an average of the lengths of prior holding periods.

Second Embodiment

In accordance with a second embodiment of the present invention, the method for implementing a no last look trading model are identical to the first variation of the first embodiment, except that in the second embodiment, it is the orders received from the liquidity providers that are subject to the holding period, instead of orders from the liquidity customer.

In the second embodiment, just as in the first, neither the liquidity provider nor the liquidity consumer has a last look option. Also, just as in the first variation of the first embodiment, orders from the liquidity providers will not have a Time-to-live parameter and all orders from the liquidity consumers will have a Time-to-live parameter. However, unlike the first embodiment, all orders from liquidity providers will be held as they are received by the matching engine for a period of time (holding period). This time interval will preferably be random and will range between Min and Max Time Holding Parameters. For each incoming order from liquidity providers the random holding period will be calculated prior to receiving the order. (Just like with the previous embodiment, this number will preferably be available for the liquidity pool auditing process.)

Again, contrary to the first embodiment, in the second embodiment, orders from the liquidity consumers will not be subject to the holding period. While orders from liquidity providers are being held, the information about these orders can be broadcasted anonymously to all qualified liquidity consumers informing consumers of each order coming up for a match. Qualified participants will have to subscribe to receive such messages. The types and contents of these messages will be substantially the same as messages M400 and M402 described above in connection with the first embodiment.

In the second embodiment, liquidity consumers will not be given the exact time when the incoming provider's order will be submitted to the matching engine server 108 for the match. Instead liquidity consumers will preferably use the average holding period time to estimate when the provider's order will be published on the matching engine, just as the liquidity providers did in the first embodiment.

In the second embodiment, liquidity consumers can also subscribe and receive messages that will specify position of their own orders in the trading book. That information will help liquidity consumers better position their own orders to increase or decrease their chance of matching with the incoming provider's order. Knowing the approximate time when the incoming order is presented for the match and positions of their orders in the trading book, liquidity consumers can adjust the prices they have published to the matching engine increasing or decreasing their chances to be matched against a specified order.

All orders from liquidity providers will be held as they are received by the matching engine for a period of time (order holding period). This time interval will preferably be random and will range between Min and Max Time Holding Parameters. For each incoming order from liquidity providers the random order holding period will be calculated prior to receiving the order. (These numbers will be available for the Liquidity pool Auditing process.)

Third Embodiment

In accordance with a third embodiment, instead of one or the other of the liquidity consumer or liquidity provider having its orders subject to the holding period, all participants' orders are subject to the holding period. Just as in the first and second embodiments, neither the liquidity provider nor the liquidity consumer has a last look option. Also, just as in the first variation of the first embodiment and the second embodiment, orders from the liquidity providers will not have a Time-to-live parameter and all orders from the liquidity consumers will have a Time-to-live parameter. However, unlike the first and second embodiments, orders from both the liquidity consumers and liquidity providers will be subject to the holding period.

Contrary to the first and second embodiments, in the third embodiment, orders from the liquidity consumers and providers will be subject to the order holding period. While orders from liquidity providers and consumers are being held the information about these orders can be broadcasted anonymously to all qualified liquidity consumers and providers informing consumers and providers of each order coming up for a match. Qualified participants, be they consumers or providers, will have to subscribe to receive such messages. The types and contents of these messages will be substantially the same as messages M400 and M402 described above in connection with the first embodiment.

In accordance with the third embodiment, liquidity consumers and providers will not be given the exact time when the incoming order will be submitted to the matching engine server 108 for the match. Instead liquidity consumers and providers will preferably use the average order holding period time to estimate when the order will be published on the matching engine.

In accordance with the third embodiment, liquidity consumers and providers can also subscribe and receive messages that will specify position of their own orders in the trading book. That information will help liquidity consumers and providers better position their own orders to increase or decrease their chance of matching with the incoming order. Knowing the approximate time when the incoming order is presented for the match and positions of their orders in the trading book, liquidity consumers and providers can adjust the prices they have published to the matching engine increasing or decreasing their chances to be matched against a specified order.

Index Engine

An additional aspect of the present invention is embodied in the provision of an index engine implementation. As part of this invention, to provide transparency and confidence to the market participants, in a preferred embodiment, the liquidity pool of the ECN will also be a price source for an index engine. The index engine is responsible for producing a series of currency based indices. All prices published in the ECN will be used in calculating currency indices. Also all executions in this ECN will be used in calculating currency indices.

To increase efficiency of the index calculation and publishing process, and to allow index engine to timely process a high number of messages and to decrease latency it is preferred that the index engine be directly coupled to the ECN, allowing it to be tightly integrated into this ECN's ecosystem. To accomplish this, the index engine preferably runs on the same network or is connected to the ECN via the Internet or via a direct private network connection.

Figure 3:
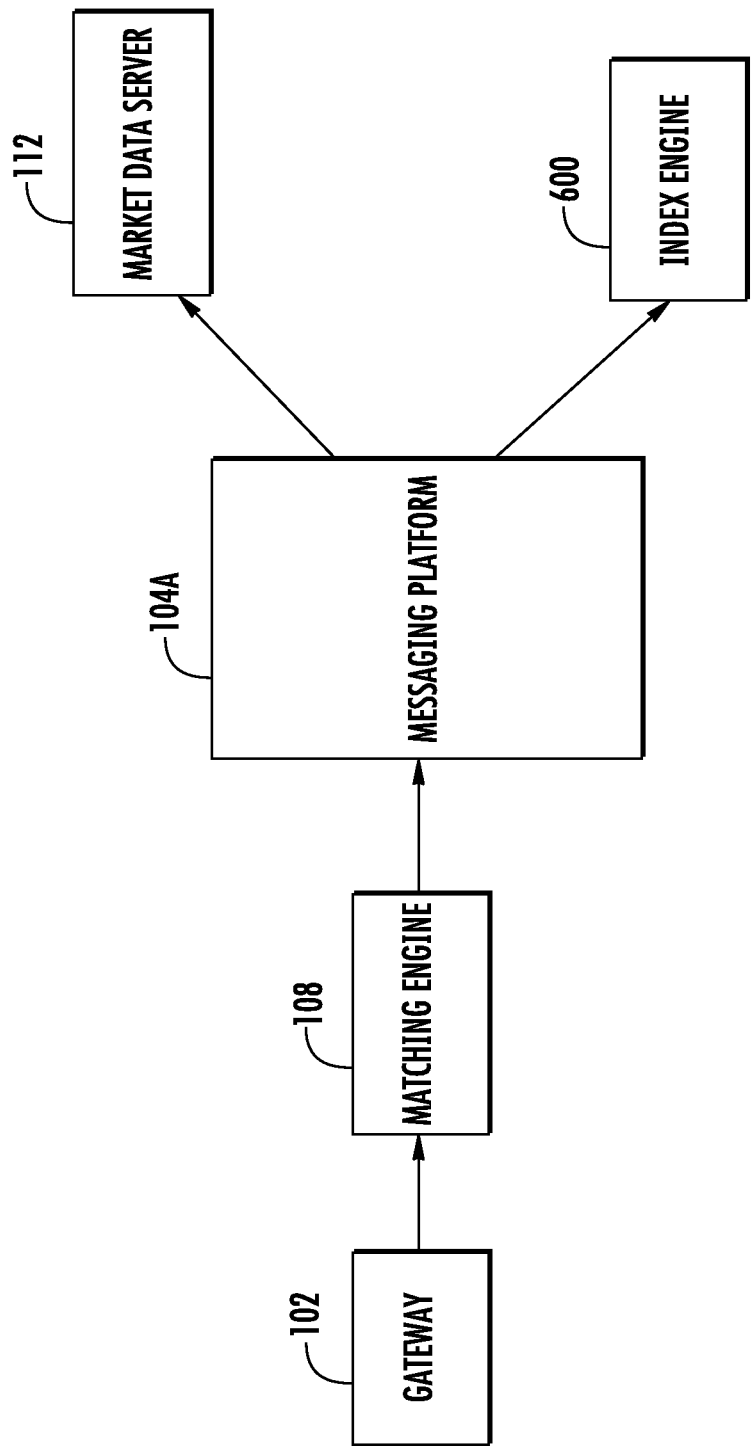
FIG. 3 is a diagram illustrating the integration into the electronic trading system of an index engine, according to another embodiment.

FIG. 3 illustrates an example of how the index engine connects with the ECN. The index engine 600 receives from the matching engine server 108, via the messaging platform 104A, information relating to all prices on the matching engine server 108 on the ECN as well as information relating to every trade executed on the matching engine server 108, and uses this information to generate and provide one or more indices. The market data server 112 also receives this information. Such index information provides an indication of the state of the market, without identifying information about particular trades. Such indices are valuable to traders in that they present a real time snapshot of the market with minimum latency. The index calculation and publication process will include verification of all prices available on the ECN at the time and will confirm that no manipulation took place between liquidity providers and liquidity consumers placing the orders and orders being matched in the matching engine.

Index engine will receive each price update and each execution from the matching engine. Every time there is a new price published by the matching engine. The index engine will calculate the new index price value. The index price value will be calculated as a vwap (volume weighted average) price.

VWAP is calculated using the following formula:

$$P_{VWAP} = \frac{\sum_j P_j \cdot Q_j}{\sum_j Q_j}$$

Where:
$P_{VWAP}$=Volume Weighted Average Price
P=price of order j
$Q_j$=quantity of order j
j=each individual order available at the time of the calculation The indices will be published to reflect different levels of market depth. It is contemplated to publish various index values between 1 million vwap index and 1 billion million vwap index in USD term or in term of any other base currency. It is contemplated to publish Bid and Offer side indices as well as Mid-point price index. Every time there is an execution on the ECN it will be published as both Bid and Offer Index value.

Audit Process

Preferably the liquidity pool/ECN implements a built-in price verification and audit functionality. This functionality guarantees that there are no manipulations and all the trading and price making is performed in a transparent and open manner in accordance with the rules of the ECN. To achieve this goal, the following steps will be performed:

1. Every price published in this Liquidity pool will be traceable to the source of this price.
2. Every price published in this Liquidity pool will be used in calculating currency indices.
3. Every execution in this Liquidity pool will be published as a print on the index.
4. As part of publishing the indices, every time an index value is calculated and published the system will make available to an independent third party all of the underlying prices that were part of the calculation of the index value in question. This information will also include sources of all underlying prices. The system will store in the data repository all the prices received by the ECN at the Customer gateway level and at the LP gateway level as well as prices received by the Index Engine. All the data will be available to the independent third party for verification and audit.
5. The independent third party can therefore randomly verify values of published indices and all executions to make sure that none of the trading and market making activities in this liquidity pool were manipulated, and to make sure that none of the trading and market making activities in this liquidity pool were performed without a full transparence and full disclosure.

ECN Performance Improvement

As with any system where speed of message processing and speed of execution of trades is paramount, this ECN relies on powerful computers and highly parallelized software systems to process maximum amount of prices and trades per given time unit. The ECN is implemented using computer-based and computer-implemented systems and methods where all modules such as Matching Engine 108 and Credit, Order Validation Server 104 and various other Gateways and Data Servers may be implemented to run on different computer servers. In addition each server may be implemented to run multiple instances. For example, there may be one Matching Engine responsible for processing all orders for EUR/USD instrument implemented to run on one server and there could be another Matching Engine responsible for processing all orders for USD\JPY instrument implemented to run on a different server.

Traditionally ECNs and exchanges use a single security as a tradable unit and will assign different units to different threads in a single computer or will assign different units to run on different computers altogether. In such an architecture, there is a physical limitation as to how many messages the system can process, or how many trades can be executed, which is determined by how many operations one thread or one server can perform.

That is, all the orders for that single security will be processed by the designated thread or designated computer. Thus all the messages submitted to the ECN will be directed to the thread running a corresponding tradable instrument, tradable unit. In accordance with another aspect of the present invention, bids and offers are separated into different units and the bid book and offer book are run on different threads and/or different computers.

Figure 4:
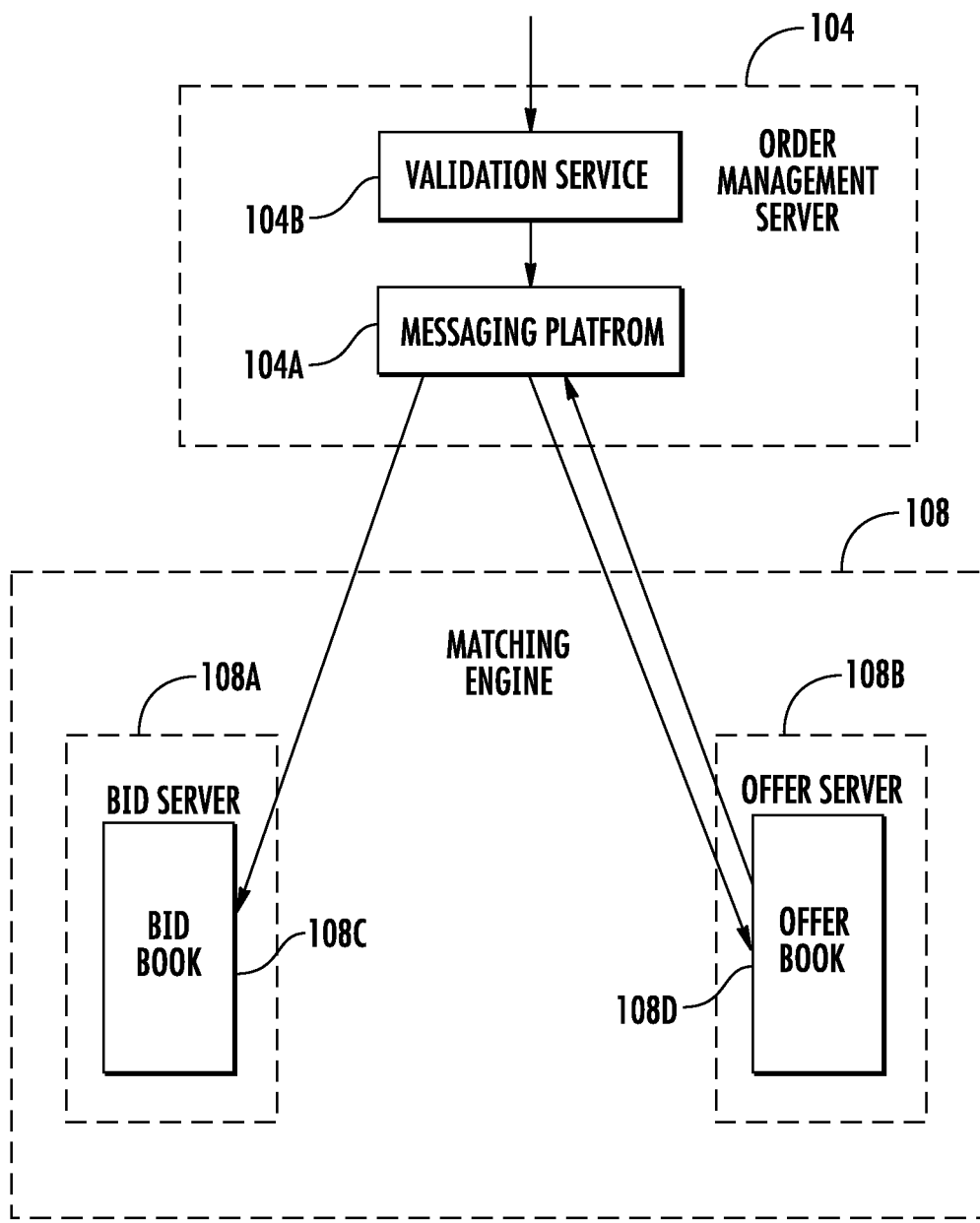
FIG. 4 is a diagram illustrating the structure of a matching engine implementing a distributed-book functionality, in accordance with another embodiment.

As shown in FIG. 4, when an order to buy (bid) is submitted to the ECN 100, once the order goes through the validation server 104, and has been validated by validation service 104B, the messaging platform 104A submits this order to an offer server 108B, a process in the matching engine server 108 that is responsible for running the offer book 108D. The offer server 108B then determines if there is an offer that can be matched with the submitted bid order. If there is such an offer the offer server 108B proceeds with the match and execution of the trade. If no match is determined, the offer server 108B sends this buy order, via the messaging platform 104A, to the bid server 108A (having a bid book 108C) where this buy order will be placed into the bid list, in an appropriate order sorted by price, time and any other relative parameter.

By separating the bid server and offer server and running these two processes on separate threads and/or separate computers, the physical performance of the ECN system can be significantly improved, i.e., almost doubled.

Figure 5:
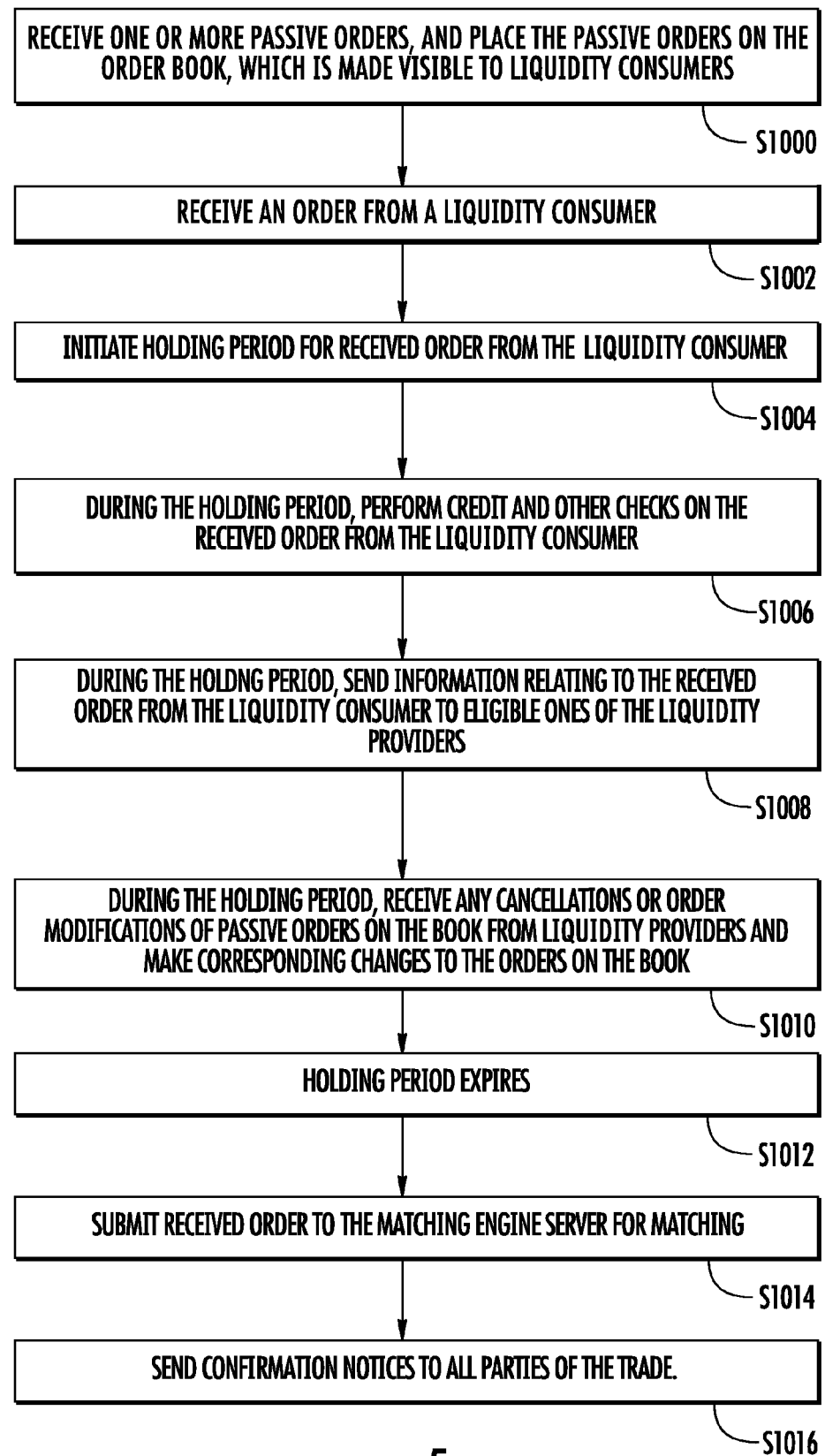
FIG. 5 is a flow diagram of a method of handling orders according to an embodiment of the present invention.

FIG. 5 is a flow chart showing order processing in accordance with an exemplary embodiment. At Step 1000, one or more passive orders are received, from one or more liquidity providers, by the system, in particular by the gateway server, and placed on the order book, which is made visible to liquidity consumers. At Step 1002, an order is received from a liquidity consumer. Such an order may be an order placed with the purpose of matching an existing passive order on the book, or may be a new passive order. At Step 1004 the received order is made subject to a holding period before being sent to the matching engine server 108. At Step 1006, during the holding period, credit and other checks are performed in relation to the received order. Also during the holding period, at Step 1008, information relating to the received order is sent to eligible ones of the liquidity providers. During the holding period, at Step 1010 the system permits liquidity providers to modify or cancel any of their passive orders and receives such cancellations or order modifications.

At Step 1012 the hold period expires. At Step 1014, the received order is forwarded to the matching engine server 108 and matched with any available orders subject to match. As discussed above, matching is performed on a price and time priority, as is well known in the art. No cancellation of orders by the liquidity providers will be effected after the expiration of the holding period. Once the received order has been matched, then, at Step 1016, order confirmations will be sent to both parties to the trade.

The method and system described above provides an execution auction system methodology that benefits both liquidity providers and liquidity consumers. Liquidity providers are incentivize to provide no last look liquidity and to participate in the auction and compete on prices more aggressively. Advantageously to liquidity providers, the system and method of the present invention prevents abuse by all low latency/high frequency trading participants and gives liquidity providers transparency of incoming orders and the forward looking state of the market.

Liquidity consumers benefit from the elimination of pricing mirage. That is, by virtue of the structure and methods of the present invention, if a price is published by a liquidity provider the liquidity consumers can trade on that price and the liquidity provider does not have an opportunity to accept or reject the trades after the match, i.e., no last look is provided.

Also, as a mini auction is created for each consumer's order, liquidity providers will compete for each liquidity consumer's order. Moreover, the vast majority of liquidity consumer orders will be executed faster vs. any traditional liquidity pool with the last look functionality.

Additionally, execution time for the liquidity consumers (holding time plus internal execution time) is limited. This limited time will (for the first time) give liquidity consumers opportunity to incorporate this information into their trading strategies. Eliminating other latency and execution delays by performing all necessary checks and validations while customer order is being held, is also advantageous.

Preferably, liquidity consumers can elect to specify longer holding periods to give liquidity providers longer time to respond to the auction. This option is especially appealing when used with larger orders submitted for execution or with more exotic, less liquidity instruments are being traded.

As noted above, the methods and systems described above can be implemented with trading systems or Electronic Communication Networks (ECN) for trading any financial instrument, including currency, and are not limited to trading currencies.

For example, the methods and systems described above can be implemented with the methods and systems described in co-pending applications of commonly owned by Applicants' assignee, including, U.S. patent application Ser. No. 12/750, 670, entitled Hybrid OTC FX/FX ETF Primary Market Electronic Communication Network Technology Processing Systems And Methods For Offering, Trading, Issuing, Creating, Redeeming And Clearing Foreign Exchange Based Exchange Traded Funds And Creating, Calculating And Publishing Foreign Exchange Index And Tracking The Value Of Foreign Exchange Rates, filed Mar. 30, 2010, and U.S. patent application Ser. No. 12/274,319, entitled Systems And Methods For Creation, Issuance, Redemption, Conversion, Offering, Trading, And Clearing A Debt Obligation Convertible Into Cash Plus A Spot Foreign Exchange Contract That Is Priced To Reflect The Value Of The Debt Obligation In A Base Currency In Relation To The Value Of A Reference Currency, filed Nov. 19, 2008.

Liquidity providers and liquidity consumers preferably use trading terminals to perform methods described above and interact with systems described above. Liquidity consumer trading terminals are also referred to as Customer Computers. Trading terminals can be computers having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element), can be used. Other kinds of devices can be used; for example, feedback provided to the user can be any form of sensory feedback, e.g., visual feedback, auditory feedback, or tactile feedback; and input from the user can be received in any form, including acoustic, speech, or tactile input. It is also preferable to use computers having a display device to receive and send data and to process data and perform calculations to facilitate execution of their functions.

The trading terminals for liquidity providers and consumers both have trade execution graphical user interfaces (GUI) or (Application Programming Interfaces (API). The trade execution GUI or API preferably performs exemplary functions and capabilities that include the ability to receive information concerning trade orders (bids and offers) that are broadcasted to eligible liquidity providers and consumers, including order price, order amount, order time, order rank or position, and order holding time holding time for resting orders. A GUI or API for order entry using the systems and methods described above also would include functions for modifying or canceling orders and the ability to receive messages concerning offer holding periods, execution and cancellation of orders, and compliance with execution auction system rules. These functions can be arranged in a multitude of ways. The order entry screen GUI 200 can be customized with regard to type of data presented or the order in which the data is presented to suit an individual trader's needs according to methods known to those skilled in the art as well as those that have not been invented yet. The order entry screen GUI or API also can contain a password or other security protection function to enable access to trade financial instruments according to the methods and systems described herein. Communications sent to and received at trading terminals on which the order entry screen GUI 200 is generated can be encrypted.

The invention has been described in terms of particular embodiments. The alternatives described herein are examples for illustration only and not to limit the alternatives in any way. The steps of the invention can be performed in a different order and still achieve desirable results. It will be obvious to persons skilled in the art to make various changes and modifications to the invention described herein. To the extent that these variations depart from the scope and spirit of what is described herein, they are intended to be encompassed therein. It will be understood by those skilled in the art that various changes in form and details may be made therein without departing from the scope of the invention encompassed by the appended claims.

What is claimed is:

1. A computerized method for providing open execution auction trading of financial instruments on a computerized trading system having one or more server computers, the method comprising:

receiving, at at least one of the server computers of the trading system, one or more communications from one or more liquidity providers, each communication including at least one passive order, including at least a price and a quantity, and at least one of the servers putting the received at least one passive order on a book of orders available for trading that can be viewed by participants of the trading system;

receiving, at least one of the server computers of the trading system, an order, including at least a price, from one or more liquidity consumers, and, in response to receipt of the order from the one or more liquidity consumers, at least one of the servers initiating a holding period during which every order received from the liquidity consumers is held without being forwarded for matching with other orders on the book of orders, the holding period having a duration set at random, between minimum and maximum duration parameters, before receiving the order from the liquidity consumer;

during the holding period, at least one of the servers performing checks on the orders received from the liquidity consumers;

during the holding period, at least one of the servers sending information relating to every one of the orders received from the one or more liquidity consumers to eligible ones of the one or more liquidity providers that meet price feed requirements and qualifications that include having made bids and offers pending when the information is sent and not exceeding holding period cancellation limits;

during the holding period, if changes to the one or more orders on the book of orders are received from the liquidity providers, modifying the one or more orders on the book of orders and revising the book of orders to reflect the modification;

upon expiration of the holding period, passing the order from the liquidity consumer to a matching engine server for matching with orders that remain on the book of orders after any revisions to the book of orders; and matching, at the matching engine server, the order received from the liquidity consumer with a matching order resting on the book of orders to execute a trade, wherein the changes requested by the liquidity providers during the holding period include modifying the price of an order and canceling an order.

2. The computerized method of claim 1 wherein the modifying the price of an order includes increasing and decreasing the price.

3. The computerized method of claim 1 wherein the information relating to the received order that is sent to the eligible liquidity provider includes information as to the price and the quantity of the received order.

4. The computerized method of claim 1, further comprising the step of, during the holding period, sending, to eligible ones of the one or more liquidity providers, information relating to the position in the book of orders of one or more passive orders of the liquidity provider.

5. The computerized method of claim 1, further comprising sending order confirmations to all parties of an executed trade.

6. The computerized method of claim 1 wherein the checks performed on the order received from the liquidity consumer include a credit check.

7. The computerized method of claim 6 wherein the credit checks are performed using one or more prime brokers.

8. The computerized method of claim 1 wherein if, after the expiration of the holding period, no match can be found for the order from the liquidity consumer, the order is placed on the book of orders so as to be eligible to be matched with an order subsequently received from other liquidity consumers or from a liquidity provider.

9. A computerized trading system having one or more server computers, respective ones of the one or more server computers being configured and programmed to:

receive, at least one of the server computers of the trading system, one or more communications from one or more liquidity providers, each communication including at least one passive order, including at least a price and quantity, and the one or more servers putting the received at least one passive order on a book of orders available for trading that can be viewed by participants of the trading system;

receive, at least one of the server computers of the trading system, one or more orders, including at least a price and quantity, from one or more liquidity consumers, and, in response to receipt of the one or more orders from the liquidity consumers, the one or more servers initiate a holding period during which every one of the orders received from the liquidity consumers is held without being forwarded for matching with other orders on the book of orders, and set the duration of the holding period at random, between minimum and maximum duration parameters, before receiving the order from the liquidity consumer;

during the holding period, the one or more servers perform checks on the one or more orders received from the liquidity consumer;

during the holding period, the one or more servers send information relating to every one of the orders received orders from the liquidity consumers to eligible ones of the one or more liquidity providers that meet price feed requirements and qualifications that include having made bids and offers pending when the information is sent and not exceeding holding period cancellation limits;

during the holding period, if changes to the one or more orders on the book of orders are received from the liquidity providers, the one or more servers modify the one or more orders on the book of orders and revise the book of orders to reflect the modification;

upon expiration of the holding period, the one or more servers pass the order from the liquidity consumer to a server of the trading system having a matching function for matching with orders that remain on the book of orders after any revisions to the book of orders; and match, at the trading system server with the matching function, the order received from the liquidity consumer with a matching order on the book of orders to execute a trade, wherein the changes requested by the liquidity provider during the holding period include modifying the price of the order and cancelling the order.

10. The computerized trading system of claim 9 wherein the modifying the price of an order includes increasing and decreasing the price.

11. The computerized trading system of claim 9 wherein the information relating to the received order that is sent to the eligible liquidity providers includes information as to the price and the quantity of the received order.

12. The computerized trading system of claim 9, the respective ones of the one or more server computers being configured and programmed to during the holding period, send, to eligible ones of the one or more liquidity providers, information relating to the position in the book of orders of one or more passive orders of the liquidity provider.

13. The computerized trading system of claim 9, wherein the one or more servers send order confirmations to all parties of an executed trade.

14. The computerized trading system of claim 9 wherein the checks that the one or more servers perform on the order received from the liquidity consumer include a credit check.

15. The computerized trading system of claim 14 wherein the credit checks are performed using one or more prime brokers.

16. The computerized trading system of claim 9 wherein if, after the expiration of the holding period, no match can be found for the order from the liquidity consumer, the one or more servers place the order on the book of orders so as to be eligible to be matched with an order subsequently received from other liquidity consumers or from a liquidity provider.

17. The computerized trading system of claim 9 wherein the server performing the matching function includes an offer server that processes received offers for matching, and a bid server, that processed received bids for matching.

18. The computerized trading system of claim 9, further comprising an index engine server that receives all information from the book of orders and from all executed orders and generates price indices indicative of the state of the market at any given point in time.

19. A computerized method for providing open execution auction trading of financial instruments on a computerized trading system having one or more server computers, the method comprising:

receiving, at least one of the server computers of the trading system, one or more communications from one or more market participants of a first class, each communication including at least one passive order, including at least a price, and, after expiration of a holding period, putting the received at least one passive order on a book of orders available for trading that can be viewed by participants of the trading system;

receiving, at least one of the server computers of the trading system, an order, including at least a price, from a market participant of a second class, and, in response to receipt of the order from the market participant of the second class, initiating a holding period having a duration set at random, between minimum and maximum duration parameters, before receiving the order from the one or more market participants of the first class during which the order from the market participant of a second class is held without being forwarded for matching with other orders on the book of orders;

during the holding period, performing checks on the an order the receipt of which triggered a holding period;

during the holding period, sending information relating to the received orders to eligible ones of market participants of the first or second class providers that meet price feed requirements and qualifications that include having made bids and offers pending when the information is sent and not exceeding holding period order cancellation limits;

during the holding period, if changes to the one or more orders on the book of orders are received from market participants of the first or second class, modifying the one or more orders on the book of orders and revising the book of orders to reflect the modification;

upon expiration of the holding period, passing the held order to a matching engine server for matching with orders that remain on the book of orders after any revisions to the book of orders; and matching, at the matching engine server, the previously held order with a matching order on the book of orders to execute a trade, wherein the changes requested by the liquidity provider during the holding period include modifying the price of an order and canceling the order.

20. The computerized trading system of claim 19, wherein the modifying the price order includes increasing and decreasing the price.

21. A computerized method for providing open execution auction trading of financial instruments on a computerized trading system having one or more server computers, the method comprising:

receiving, at least one of the server computers of the trading system, one or more communications from one or more liquidity providers, each communication including at least one passive order, including at least a price and quantity, and putting the received at least one passive order on a book of orders available for trading that can be viewed by participants of the trading system;

receiving, at least one of the server computers of the trading system, an order, including at least a price and quantity, from one or more liquidity consumers, and, in response to receipt of the orders from the one or more liquidity consumers and the one or more liquidity providers, initiating a holding period, the holding period having a duration set at random, between minimum and maximum duration parameters, before receiving the order from the liquidity consumer, wherein the liquidity providers and the liquidity consumers will not be given an exact time when the holding period expires, during said holding period the orders from the liquidity consumer and the liquidity providers are held without being forwarded for matching with other orders on the book of orders;

during the holding period, performing checks on the one or more orders from the one or more liquidity consumers and the one or more liquidity providers;

during the holding period, sending information relating to the received orders from the liquidity consumer to eligible ones of the one or more liquidity providers that meet price feed requirements and qualifications that include having made bids and offers pending when the information is sent and not exceeding holding period order cancellation limits, said information includes information on order position for their own orders;

during the holding period, if changes to the one or more orders on the book of orders are received from the liquidity providers, modifying the one or more orders on the book of orders and revising the book of orders to reflect the modification;

upon expiration of the holding period, passing the order from the liquidity consumer to a matching engine server for matching with orders that remain on the book of orders after any revisions to the book of orders; and matching, at the matching engine server, the order received from the liquidity consumer with a matching order on the book of orders to execute a trade, wherein the changes that can be requested by the liquidity consumers and the liquidity providers during the holding period include modifying the price of an order or canceling the order.

22. The computerized trading system of claim 21, wherein the modifying the price order includes increasing and decreasing the price.

23. A computerized trading system having one or more server computers, respective ones of the one or more server computers being configured and programmed to:

receive, at least one of the server computers of the trading system, one or more communications from one or more liquidity providers, each communication including at least one passive order, including at least a price, and put the received at least one passive order on a book of orders available for trading that can be viewed by participants of the trading system;

receive, at least one of the server computers of the trading system, one or more orders, including at least a price, from one or more liquidity consumers, and, in response to receipt of the one or more orders from the liquidity consumers, initiate a holding period, the holding period having a duration set at random, between minimum and maximum duration parameters, before receiving the order from the liquidity consumer, during which the one or more orders from the liquidity consumers and the one or more orders from the liquidity providers are held without being forwarded for matching with other orders on the book of orders;

during the holding period, perform checks on the one or more orders from the liquidity consumers and the liquidity providers;

during the holding period, send information relating to the one or more received orders from the liquidity consumers and the liquidity providers to eligible ones of the one or more liquidity providers that meet price feed requirements and qualifications that include one or more of having made bids and offers that are pending when the information is sent and not exceeding holding period order cancellation limits;

during the holding period, if changes to the one or more orders on the book of orders are received from the liquidity providers, modify the one or more orders on the book of orders and revise the book of orders to reflect the modification;

upon expiration of the holding period, pass the orders from the liquidity consumers and the orders from the liquidity providers to a server of the trading system having a matching function for matching with orders that remain on the book of orders after any revisions to the book of orders; and match, at the server with the matching function, the order received from the liquidity consumer with a matching order on the book of orders to execute a trade, wherein the changes requested by the liquidity provider during the holding period include modifying the price of the order or cancelling the order.

24. The computerized trading system of claim 23, wherein the modifying the price of the order includes increasing and decreasing the price.

* * * * *